United States Patent
Green et al.

(10) Patent No.: US 7,422,851 B2
(45) Date of Patent: Sep. 9, 2008

(54) CORRECTION FOR ILLUMINATION NON-UNIFORMITY DURING THE SYNTHESIS OF ARRAYS OF OLIGOMERS

(75) Inventors: Roland Green, Madison, WI (US); Francesco Cerrina, Madison, WI (US); Jasjit J. Singh, Madison, WI (US)

(73) Assignee: Nimblegen Systems, Inc., Madison, WI (US)

( * ) Notice: Subject to any disclaimer, the term of this patent is extended or adjusted under 35 U.S.C. 154(b) by 0 days.

(21) Appl. No.: 10/061,577

(22) Filed: Jan. 31, 2002

(65) Prior Publication Data

US 2003/0143550 A1  Jul. 31, 2003

(51) Int. Cl.
- C12M 1/36 (2006.01)
- C12N 11/16 (2006.01)
- G01N 15/06 (2006.01)
- G02N 26/08 (2006.01)

(52) U.S. Cl. .................. 435/6; 435/91.1; 435/283.1; 435/287.2; 536/23.1; 536/25.3; 422/82.05; 359/212

(58) Field of Classification Search .............. 435/6, 435/174, 283.1, 287.2, 288.7; 536/25.3
See application file for complete search history.

(56) References Cited

U.S. PATENT DOCUMENTS

| | | | |
|---|---|---|---|
| 5,843,655 A * | 12/1998 | McGall | 435/6 |
| 5,870,176 A * | 2/1999 | Sweatt et al. | 355/53 |
| 6,262,795 B1 * | 7/2001 | Baker et al. | 355/53 |
| 6,271,957 B1 * | 8/2001 | Quate et al. | 359/298 |
| 6,344,641 B1 * | 2/2002 | Blalock et al. | 250/205 |
| 2003/0002040 A1 * | 1/2003 | MacAulay et al. | 356/317 |

OTHER PUBLICATIONS

U.S. Appl. No. 60/296,635.*

* cited by examiner

Primary Examiner—BJ Forman
(74) Attorney, Agent, or Firm—Quarles & Brady LLP

(57) ABSTRACT

The present invention provides an apparatus and a method for the synthesis of arrays of oligomers that have tight illumination intensity requirement. The apparatus and the method contains a mechanism to correct for illumination nonuniformity during the oligomer array synthesis process. To correct for illumination nonuniformity, the illumination intensity of different oligomer synthesis positions across an area in which oligomers are synthesized are determined first. Then, the difference in illumination intensity among the positions are evaluated mathematically. Next, any nonuniformity in illumination intensity is corrected by either reducing the intensity of the light for the brighter positions before the light reaches the illumination area or reducing the illumination time of the brighter positions during one protection group deprotection period.

7 Claims, 3 Drawing Sheets

CORRECTION FOR ILLUMINATION NON-UNIFORMITY DURING THE SYNTHESIS OF ARRAYS OF OLIGOMERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The sequencing of deoxyribonucleic acid (DNA) is a fundamental tool of modern biology and is conventionally carried out in various ways, commonly by processes which separate DNA segments by electrophoresis. See, e.g., "DNA Sequencing," *Current Protocols In Molecular Biology*, Vol. 1, Chapter 7 (1995). The sequencing of several important genomes has already been completed (e.g., yeast, *E. coli*), and work is proceeding on the sequencing of other genomes of medical and agricultural importance (e.g., human, *C. elegans*, Arabidopsis). In the medical context, it will be necessary to "re-sequence" the genome of large numbers of human individuals to determine which genotypes are associated with which diseases. Such sequencing techniques can be used to determine which genes are active and which are inactive, either in specific tissues, such as cancers, or more generally in individuals exhibiting genetically influenced diseases. The results of such investigations can allow identification of the proteins that are good targets for new drugs or identification of appropriate genetic alterations that may be effective in genetic therapy. Other applications lie in fields such as soil ecology or pathology where it would be desirable to be able to isolate DNA from any soil or tissue sample and use probes from ribosomal DNA sequences from all known microbes to identify the microbes present in the sample.

The conventional sequencing of DNA using electrophoresis is typically laborious and time consuming. Various alternatives to conventional DNA sequencing have been proposed. One such alternative approach, utilizing an array of oligonucleotide probes synthesized by photolithographic techniques is described in Pease, et al., "Light-Generated Oligonucleotide Arrays for Rapid DNA Sequence Analysis," *Proc. Natl. Acad. Sci. USA*, 91: 5022-5026 (May 1994). In this approach, the surface of a solid support modified with photolabile protecting groups is illuminated through a photolithographic mask, yielding reactive hydroxyl groups in the illuminated regions. A 3' activated deoxynucleoside, protected at the 5' hydroxyl with a photolabile group, is then provided to the surface such that coupling occurs at sites that had been exposed to light. Following capping, and oxidation, the substrate is rinsed and the surface is illuminated through a second mask to expose additional hydroxyl groups for coupling. A second 5' protected activated deoxynucleoside base is presented to the surface. The selective photodeprotection and coupling cycles are repeated to build up levels of bases until the desired set of probes is obtained. It may be possible to generate high density miniaturized arrays of oligonucleotide probes using such photolithographic techniques wherein the sequence of the oligonucleotide probe at each site in the array is known. These probes can then be used to search for complementary sequences on a target strand of DNA, with detection of the target that has hybridized to particular probes accomplished by the use of fluorescent markers coupled to the targets and inspection by an appropriate fluorescence scanning microscope. A variation of this process using polymeric semiconductor photoresists, which are selectively patterned by photolithographic techniques, rather than using photolabile 5' protecting groups, is described in McGall, et al., "Light-Directed Synthesis of High-Density Oligonucleotide Arrays Using Semiconductor Photoresists, *Proc. Natl. Acad. Sci. USA*, 93:13555-13560 (November 1996), and G. H. McGall, et al., "The Efficiency of Light-Directed Synthesis of DNA Arrays on Glass Substrates," *Journal of the American Chemical Society* 119:22:5081-5090 (1997).

A disadvantage of both of these approaches is that four different lithographic masks are needed for each monomeric base, and the total number of different masks required are thus four times the length of the DNA probe sequences to be synthesized. The high cost of producing the many precision photolithographic masks that are required, and the multiple processing steps required for repositioning of the masks for every exposure, contribute to relatively high costs and lengthy processing times.

A similar problem exists for synthesis of diverse sequences of other types of oligomers such as polypeptides, which is useful for determining binding affinity in screening studies. For example, Pirrung et al., U.S. Pat. No. 5,143,854 (see also PCT Application No. WO 90/15070) discloses methods of forming vast arrays of peptides using light-directed synthesis techniques. However, the large number of lithographic masks needed in the synthesis makes the fixed cost for this process relatively high and the processing time lengthy.

A patterning process described in Cerrina et al., PCT Application No. WO 99/42813 overcomes the above problems. With this patterning process, an image is projected onto an activate surface of a substrate for oligomer synthesis utilizing an image former that includes a light source that provides light to a micromirror device including an array of electronically addressable micromirrors. The substrate is activated in a defined pattern and monomers are coupled to the activated sites, with further repeats until the elements of a two-dimensional array on the substrate have an appropriate monomer bound thereto. The micromirror arrays can be controlled in conjunction with an oligomer synthesizer to control the sequencing of images presented by the micromirror array in coordination with the reagents provided to the substrate. The patterning process eliminated the requirement of lithographic masks for selectively illuminating certain oligomer synthesis positions. However, the patterning process does not always provide completely uniform illumination intensity across an area in which numerous oligomers of an array are synthesized. When the illumination intensities are not uniform across the area, in order to deliver enough intensity to the areas of lower intensity, higher intensity areas may be overexposed. This result will lead to problems in oligomer synthesis in areas adjacent to the high intensity areas.

BRIEF SUMMARY OF THE INVENTION

In general, the present invention provides for a mechanism to correct for nonuniformity in illumination intensity during the synthesis of oligomer arrays by the patterning process. As a first step to correct for illumination nonuniformity, the illumination intensity of different oligomer synthesis positions across the illumination area are measured. Then the difference in illumination intensity among different oligomer synthesis positions are evaluated mathematically. Next, the illumination intensity of brighter position(s) are adjusted to match that of a less bright position. In one embodiment of the invention, the illumination intensity of an oligomer synthesis position is adjusted by reducing the illumination intensity of the light before the light reaches the illumination area. An exemplary method for doing so is to place a lithographic mask in front of the illumination area with different regions of the mask that correspond to the synthesis positions darkened to appropriate gray scales. In another embodiment of the invention, the illumination intensity of an oligomer synthesis position is adjusted by changing the illumination time during one protection group deprotection period. One exemplary method for changing the illumination time is to adjust the duty cycle of the optical elements. After the first round of illumination intensity adjustment, the illumination intensity of different oligomer synthesis positions can be measured and adjusted again if necessary to achieve higher uniformity.

The present invention has the advantage in that it enables greater uniformity in the delivery of light across the surface of an array being synthesized so that the polymers are constructed in a more uniform manner.

It is a feature of the present invention that the correction for the non-uniformity in light delivery can be corrected in any of a number of ways.

Further objects, features and advantages of the invention will be apparent from the following detailed description when taken in conjunction with the accompanying drawings.

DETAILED DESCRIPTION OF THE INVENTION

Figure 1:
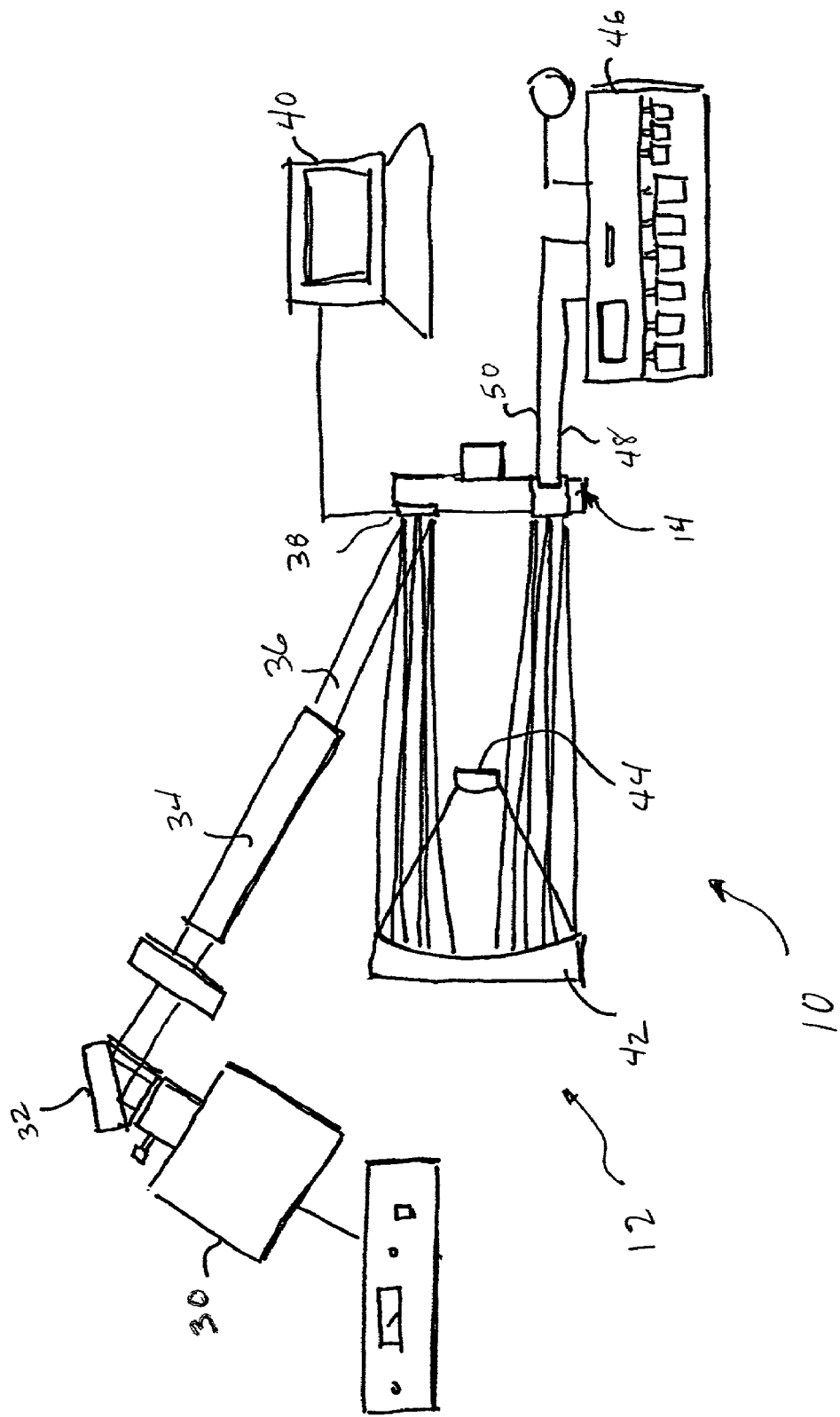
FIG. 1 is a schematic view of an array synthesizer apparatus in accordance with the present invention.

In the prior art for synthesis of arrays of oligomers, the illumination intensities across an illumination area in which oligomers are synthesized might not always be uniform. Such non-uniformities can result from non-uniformities in the light source itself or from non-uniformities in the light path between the light source and the cell in which the array is constructed. Non-uniformity in light distribution on the surface of the array under construction can lead to variations in the accuracy of the probes or polymers built in different parts of the array. It is an inherent feature of the light used to perform photodeprotection that it can also damage DNA, and it is therefore appropriate to limit the application of light to that which is needed for deprotection, and as little more as possible. The idea here is that the light intensity pattern of the light incident on the array is measured, and that the intensity of the brightest areas of the array is lowered to match in total light intensity of those areas which would otherwise be more dimly illuminated. The light application to the brightest areas is limited, most preferable, by simply turning off the mirrors directly light to areas that would be brightly lit before turning off the mirrors directing light to less illuminated areas. In this way, the total uniformity of light application across the array is increased. Another method for accomplishing the same objective is to interpose a single mask between the light source and the reaction cell to lower the effective light intensity of the brightest areas to match the illumination of less brightly illuminated areas.

This concept can be better understood with reference to an exemplary array synthesis instrument. One exemplary instrument using a flow cell with a single reaction chamber and a optical elements light array is shown generally at 10 in FIG. 1. The apparatus includes a two-dimensional array image former 12 and a flow cell or reaction chamber 14 into which an array image is projected by the image former 12. The flow cell, also shown in greater detail in FIG. 2, includes a planar substrate 16, on the rear surface of which the microarray is synthesized. The substrate 16 is placed over a chamber 18 formed in the front of an enclosure 20. An inlet port 22 and an outlet port 24 provide fluid communication into and out of the flow cell 14. The image formed is constructed to direct the light pattern to the substrate 16, where the reactions occur in the interior, or rear, surface of the substrate 16. The areas of the substrate on which the nucleic acid probes are constructed are indicated schematically in FIG. 2 at 26.

The image former 12 allows for the direction of light from a light source 30 along an optical light path and into the flow cell reaction chamber 14 so that monomer addition reactions may occur in accordance with a pre-selected pattern. The image former 12 includes the light source 30 (e.g., an ultraviolet or near ultraviolet source such as a mercury arc lamp), an optional filter 32 to receive the output beam 34 from the source 30 and selectively pass only the desired wavelengths (e.g., the 365 nm Hg line), and a condenser lens 34 for forming a collimated beam 36. The beam 36 is projected onto an array of optical elements 38.

The optical array 38 is preferable a two-dimensional array of small or miniature optical elements, or micromirrors, which are operable under electronic control such that they may be operated by the output of a general purpose digital computer 40 connected to the optical array 38. The optical array 38 includes optical elements such as mirrors which are capable of, in effect, switching light in amplitude, direction, or other attribute of the light, sufficient to change a portion of the incident light from one state where that portion of the light actuates a reaction occurring in one cell on the substrate 16 in the flow cell 14. There are several examples of optical devices which can serve as the optical array 38. One is an array of micromirrors. Other types of suitable optical arrays include without limitation microshutters, micromirrors operated by bimorph piezoelectric actuators, and LCD shutters. The preferred embodiment is a digital light projector (DLP) integrated circuit available commercially from Texas Instruments.

A micromirror array device 38 has a two-dimensional array of individual micromirrors which are each responsive to control signals supplied to the array device to tilt each individual micromirror in one of at least two directions. Control signals are provided from the computer 40 to the micromirror array device 38. The micromirrors in the array 38 are constructed so that in a first position of the mirrors the portion of the incoming beam of light 36 that strikes an individual micromirror is deflected in a direction such that the light proceeds along the optical path toward the flow cell 14, as described further below. In a second position of the micromirrors in the array 38, the light from the beam 36 striking such mirrors in such second position is away from the optical path to the flow cell, with the result that this light is ultimately absorbed by the instrument without ever being incident on the flow cell 14.

The light which is directed by mirrors in the first position (i.e. toward the flow cell 14), is directed toward the first of two mirrors 42 and 44, which in combination form an Offner optical system. The larger mirror 42 is concave and directs light incident onto one portion of it onto the smaller convex mirror 44. The convex mirror 44 directs incident light to another portion of the concave mirror 42, from which the light is directed to the flow cell 14. The projection optics 12 serve to form an image of the pattern of the micromirror array 38 on the surface of the substrate 16. A DNA synthesizer, indicated at 46, is connected to supply reagents to and from the flow cell 14 through fluid piping 48 and 50. The DNA synthesizer serve, in essence, as a source of reagents and pumping to deliver reagents to and remove solutions from the flow cell 14.

The instrument is used to construct nucleic acid probes on the substrate. In a direct photofabrication approach, the glass substrate 12 is coated with a layer of a binding layer chemical capable of binding the monomer building blocks. A photolabile protective group is adhered tot he binding layer. Light is applied by the projection system 12, deprotecting the photolabile protective groups in defined preselected areas of the substrate 16. The areas to be deprotected are selected by the operation of the mirrors in the micromirror array 38, which selective direct light to or away from the substrate 16. After the light application step, nucleotides are added to the flow cell which them chemically bond only where the de-protection of the photolabile groups has occurred (phosphoramidite DNA synthesis chemistry in the case of DNA probe synthesis). The added nucleotide also has a photolabile protective groups attached to it. This process is repeated for each of the four bases that makes up a nucleic acid monomer, and then repeated again for each level of the building probe strands in the microarray. In the end, a series of single stranded nucleic acid probes are created, the probes arranged in areas or features on the substrate. The process is simple, and if a combinatorial approach is used, the number of permutations increases exponentially. The resolution limit is presented by the linear response of the deprotection mechanism.

Figure 2:
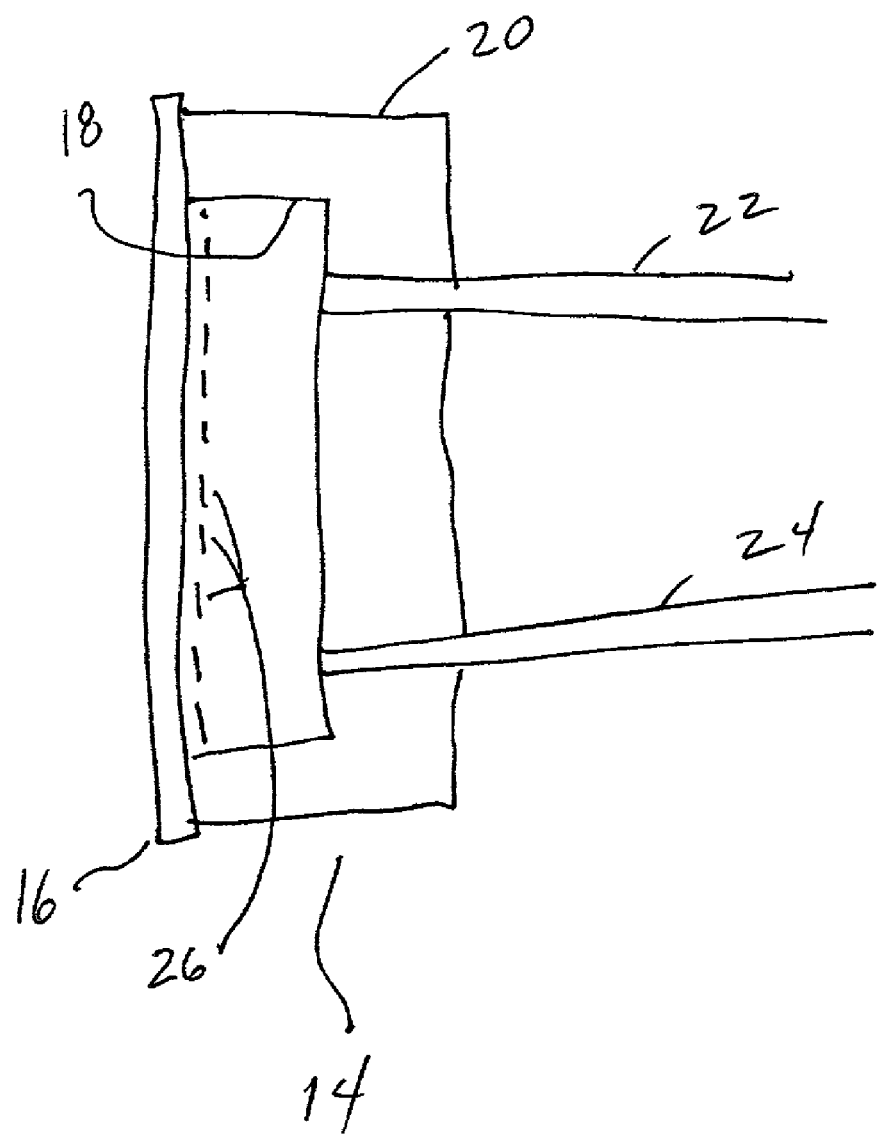
FIG. 2 is a schematic view of an array synthesizer apparatus having a lithographic mask designed for correcting illumination nonuniformity across an illumination area in which oligomers are synthesized.

A limitation in the use of the microarray synthesis instrument shown in FIG. 1 is that differences in illumination intensities at different oligomer synthesis positions or feature positions on the substrate 16 are possible. Such non-uniformities can result from any number of factors, one significant contributor of which is non-uniformity in the light emitted by the light source 30. It is desired that the light illumination across the face of the substrate be as uniform as possible in order to maximize consistency and to avoid degradation of the probes. In order for the apparatus to be used for synthesizing arrays of oligomers that require tight illumination sensitivity, the nonuniformity should be minimized.

As a first step to correct for the illumination nonuniformity, the illumination intensities of different oligomer synthesis positions or features are measured. An example of the methods that can be used for measuring illumination intensities of different oligomer synthesis positions is described. It is understood that other methods to determine the illumination intensities of different oligomer synthesis positions can also be used. To measure the illumination intensity, the whole illumination area in which oligomers will be synthesized is first covered with a layer of a first nucleotide protected by a protection group. Then, the whole area is illuminated with all the optical elements directing light to corresponding positions in the illumination area to deprotect the protection groups. It is important that this light illumination is an under exposure in that the protection group deprotection is not saturated across the illumination area. Next, a phosphor-linked second nucleotide that is complementary to the first nucleotide is added to bind to the exposed first nucleotide. Unbound second nucleotide-phosphor conjugates are washed off and fluorescence across the area is measured. The fluorescence intensity of a position correlates with the illumination intensity of that position and thus the illumination intensity can be calculated from the fluorescence intensity.

The second step to correct for illumination nonuniformity is to mathematically evaluate the difference in illumination intensities among different oligomer synthesis positions. One way to do so is to calculate gray scale correction factors. For example, assume that there are positions $P_1, P_2, \ldots P_n$ with measured intensities $I_1, I_2, \ldots I_n$. Further assume that position $P_m$ has the least intensity among the positions of which the illumination intensity will be corrected. Then the correction factor $C_j$ for position $P_j$ is the ratio of $I_m$ to $I_j$ ($C_j = I_m/I_j$). $C_m$ equals 1.0 and $C_j$ will be less than 1.0. After correction according to the correction factor $C_j$, the illumination intensity ($I_j'$) for position $P_j$ equals $I_m$ ($I_j' = C_j \times I_j$). Therefore, the illumination intensity for those corrected positions will be equal to $I_m$ and thus uniform.

Figure 3:
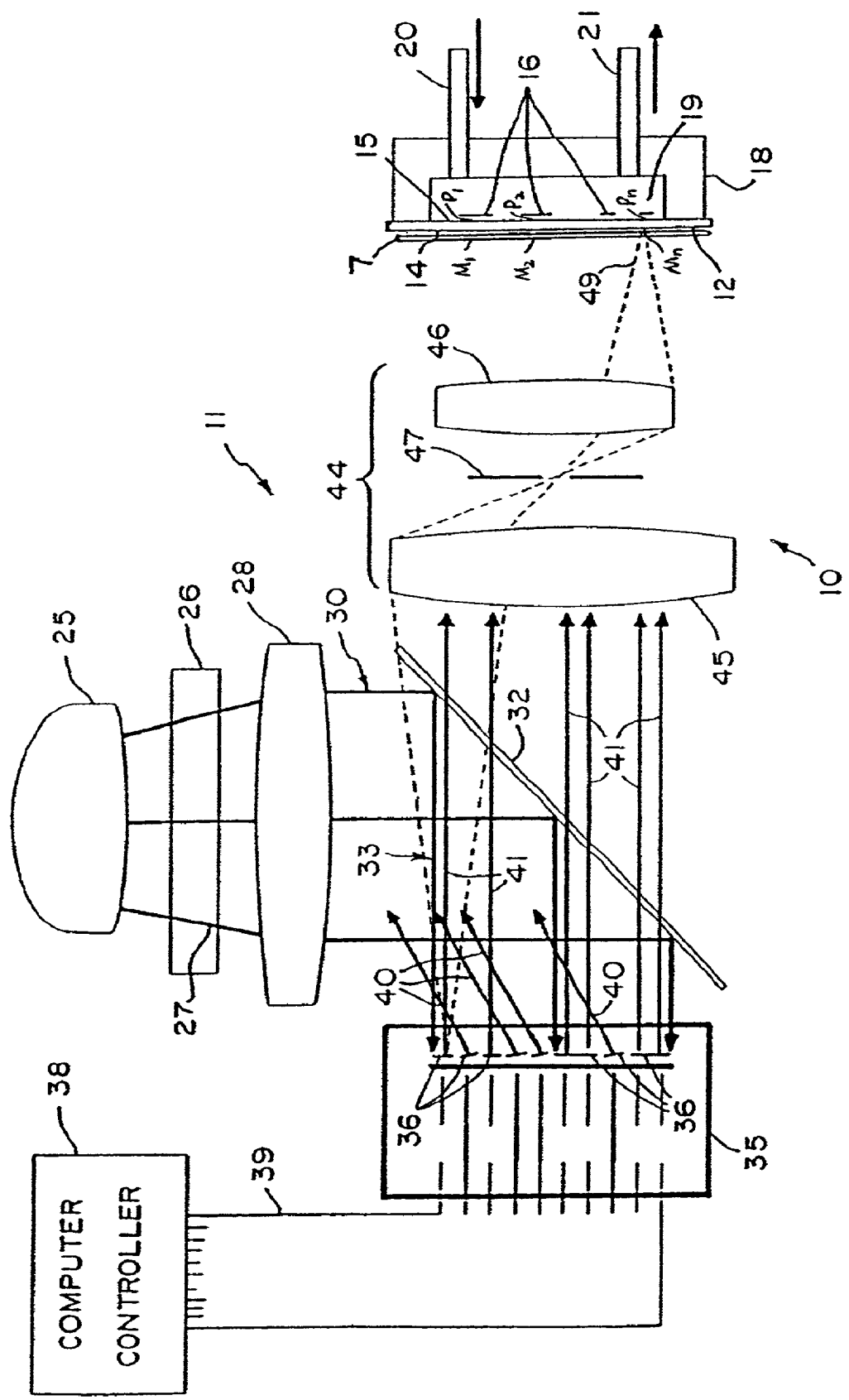
FIG. 3 is a schematic illustration of an alternative embodiment of an array synthesizer apparatus constructed in accordance with the present invention.

The third step to correct for illumination nonuniformity is to reduce the intensity of brighter positions to that of a less bright position. One way to reduce the illumination intensity of brighter positions is to reduce the intensity of the illuminating light before the light reaches these positions. An exemplary method that can be used for such reduction, as illustrated in FIG. 3, is to place a single fixed lithographic mask in front of the flow cell. Since the non-uniformities are a characteristic of the particular instrument, a single mask can be created for continuous use with that instrument. The array synthesizer of FIG. 3 is the similar in concept to that in FIG. 1 (except it does not use Offner optics) and except that a lithographic mask 7 is placed in front of the flow cell. The areas $M_1, M_2 \ldots M_n$ on the mask that correspond to synthesis positions $P_1, P_2 \ldots P_n$ can be darkened to appropriate gray scales according the correction factors $C_1, C_2 \ldots C_n$ to correct for illumination intensity nonuniformity among positions $P_1, P_2 \ldots P_n$. Other methods that reduce the light intensity to an appropriate level before the light reaches an oligomer synthesis position can also be used.

Another, and the preferred, way to reduce the intensity of a brighter position is to reduce the light exposure time for each protection group deprotection period. An exemplary method to reduce the light exposure time is to adjust the duty cycle of the optical elements. Recall that the operation of the individual micromirrors in the array 38 is under the control of the computer 40. Rather than simply switching all of the micromirrors on for the full available time period for a de-protection step, the "on" time for the various micromirrors can be individually adjusted to compensate for irregularities in the optical intensity. The micromirror element that was found to have the lowest intensity would stay on for the longer period and the periods that the other micromirrors would be switched on would vary in proportion to the intensity of the illumination created by that micromirror in the corresponding area of the array.

In essence, this concept is that the duty cycle of the micromirrors are varied. The duty cycle for an optical element is defined as the total amount of time the optical element directs light towards the corresponding oligomer synthesis position during one protection group deprotection period. In essence, the elements of the micromirror directed at the brightest positions in the array are switched off, under computer control, before the micromirror elements for area in the area that would otherwise be less brightly illuminated. The computer 40 is used to control the duty cycle adjustment of the optical elements. The adjustment can be as fine as the data available about the variations in optical intensity that would otherwise be created in the absence of adjustment of the duty cycle of the mirrors.

Steps one to three described above may be repeated if necessary to achieve higher illumination uniformity. The highest illumination uniformity level that can be achieved is controlled by the technology used to control the illumination time or the technology used to reduce the light intensity before the light reaches the illumination area. For example, in the case when illumination nonuniformity is corrected by duty cycle adjustment, if the optical array device has 256 shades capability through adjusting the duty cycle of optical elements, the highest level of uniformity in illumination intensity among different oligomer synthesis positions that can be achieved is a difference of $1/256$ or less.

FIG. 1 only illustrates one embodiment of array synthesizer apparatus to which the method to correct for illumination nonuniformity disclosed by the present invention can be applied. The present invention disclosed here can also be applied to other array synthesizer apparatuses.

It is understood that the particular embodiments for correction for illumination nonuniformity set forth herein are illustrative and not intended to confine the invention, but embraces all such modified forms thereof as come within the scope of the following claims.

We claim:

1. A method for correcting illumination nonuniformity across an illumination area during the synthesis of an array of oligomers from monomers, the illumination areas being illuminated by light directed to the illumination areas by a micromirror array during a common deprotection period, the method comprising the steps of:
    measuring the illumination intensity of at least two oligomer synthesis positions at different positions in the illumination area, each of the synthesis positions corresponding to a single micromirror in the micromirror array;
    evaluating mathematically the difference in illumination intensity between the at least two oligomer synthesis positions to identify a first synthesis position illuminated more brightly and a second synthesis position illuminated less brightly; and
    correcting illumination nonuniformity by adjusting the illumination intensity of the light directed to the first synthesis position to match that of the light directed to the second synthesis position during the deprotection period by reducing the illumination time in which the micromirror corresponding to the first synthesis position directs light to the first synthesis position as compared to the illumination time in which the micromirror corresponding the second synthesis position directs light to the second synthesis position by switching the micromirror which directs light to the first synthesis position so as to direct light away from the first synthesis position for a portion of the deprotection period.

2. The method of claim 1, further comprising the steps of:
    measuring the adjusted illumination intensity of each oligomer synthesis position; and
    further adjusting the illumination intensities of each of the synthesis positions for higher uniformity across the entire illumination area.

3. The method of claim 1, wherein the measuring step comprises the steps of:
    covering the at least two oligomer synthesis positions with a first protected nucleotide;
    directing an amount of deprotecting light to each covered position via the micromirror corresponding to the covered position, the amount of light being insufficient to fully deprotect each covered position;
    binding to the deprotected first nucleotide at each position a complimentary phosphor-linked second nucleotide; and
    measuring the illumination intensity of the bound phosphor-linked second nucleotide at each position.

4. The method as claimed in claim 3 wherein every oligomer synthesis position is covered with the first protected nucleotide.

5. A method for correcting illumination nonuniformity across an illumination area during the synthesis of an array of oligomers from monomers, the illumination area being illuminated by light directed from a micromirror array to the illumination area during a deprotection period, the method comprising the steps of:
    measuring the illumination intensity of at least two oligomer synthesis positions at different positions in the illumination area, each of the positions corresponding to the light directed from a micromirror in the micromirror array;
    evaluating mathematically the difference in illumination intensity between the at least two oligomer synthesis positions, the evaluation revealing that a first synthesis position is more brightly illuminated than a second synthesis position which is less brightly illuminated; and
    correcting illumination nonuniformity by adjusting the illumination intensity of the light directed to the first synthesis position during the deprotection period to match that of the light directed to the less brightly illuminated synthesis position during the deprotection period, the adjustment being accomplished by decreasing the portion of the time during the deprotection period that light is directed by the micromirror to the first synthesis position so that the total amount of light directed to the first synthesis position is equivalent to the total amount of light delivered to the second synthesis position.

6. The method of claim 5, wherein the measuring step comprises the steps of:
    covering the at least two oligomer synthesis positions with a first protected nucleotide;
    directing an amount of deprotecting light to each covered position via the micromirror corresponding to the covered position, the amount of light being insufficient to fully deprotect each covered position;
    binding to the deprotected first nucleotide at each position a complimentary phosphor-linked second nucleotide; and
    measuring the illumination intensity of the bound phosphor-linked second nucleotide at each position.

7. The method as claimed in claim 6 wherein every oligomer synthesis position is covered with the first protected nucleotide.

* * * * *